United States Patent
Sano et al.

(10) Patent No.: US 10,062,924 B2
(45) Date of Patent: Aug. 28, 2018

(54) LITHIUM-ION SECONDARY BATTERY WITH A NEGATIVE ELECTRODE CONTAINING VANADIUM

(71) Applicant: TDK CORPORATION, Tokyo (JP)

(72) Inventors: Atsushi Sano, Tokyo (JP); Keitaro Otsuki, Tokyo (JP); Masahiro Oishi, Tokyo (JP); Keiichi Fukuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 777 days.

(21) Appl. No.: 13/846,197

(22) Filed: Mar. 18, 2013

(65) Prior Publication Data

US 2013/0260228 A1    Oct. 3, 2013

(30) Foreign Application Priority Data

Mar. 27, 2012 (JP) .................. 2012-070952
Mar. 13, 2013 (JP) .................. 2013-050350

(51) Int. Cl.
| | | |
|---|---|---|
| *H01M 10/05* | (2010.01) | |
| *H01M 10/0567* | (2010.01) | |
| *H01M 10/0563* | (2010.01) | |
| *H01M 4/58* | (2010.01) | |
| *H01M 10/0525* | (2010.01) | |
| *H01M 10/42* | (2006.01) | |

(52) U.S. Cl.
CPC ..... *H01M 10/0567* (2013.01); *H01M 4/5825* (2013.01); *H01M 10/0525* (2013.01); *H01M 10/0563* (2013.01); *H01M 10/4235* (2013.01)

(58) Field of Classification Search
None
See application file for complete search history.

(56) References Cited

U.S. PATENT DOCUMENTS

| | | | | |
|---|---|---|---|---|
| 6,045,945 | A | * | 4/2000 | Hamamoto ....... H01M 10/0567 429/200 |
| 6,235,427 | B1 | * | 5/2001 | Idota .................... H01M 4/134 29/623.1 |
| 6,301,093 | B1 | | 10/2001 | Noguchi et al. |
| 6,531,220 | B1 | | 3/2003 | Kweon et al. |
| 2004/0126300 | A1 | | 7/2004 | Barker et al. |
| 2010/0156351 | A1 | * | 6/2010 | Ugaji et al. ................. 320/132 |
| 2011/0311868 | A1 | * | 12/2011 | Sano et al. .................... 429/211 |

FOREIGN PATENT DOCUMENTS

| | | | |
|---|---|---|---|
| CN | 1278663 A | 1/2001 | |
| CN | 1703370 A | 11/2005 | |
| JP | A-2000-268881 | 9/2000 | |
| JP | A-2004-303527 | 10/2004 | |
| JP | 2005-158725 | * 6/2005 | ............. H01M 4/58 |

* cited by examiner

*Primary Examiner* — Ula C Ruddock
*Assistant Examiner* — Tony S Chuo
(74) *Attorney, Agent, or Firm* — Oliff PLC

(57) ABSTRACT

The lithium-ion secondary battery includes a positive electrode containing an active material made of a compound including lithium and a transition metal; an electrolyte containing 5 to 30 ppm of hydrofluoric acid; and a negative electrode containing 1 to 100 ppm of vanadium.

9 Claims, 1 Drawing Sheet

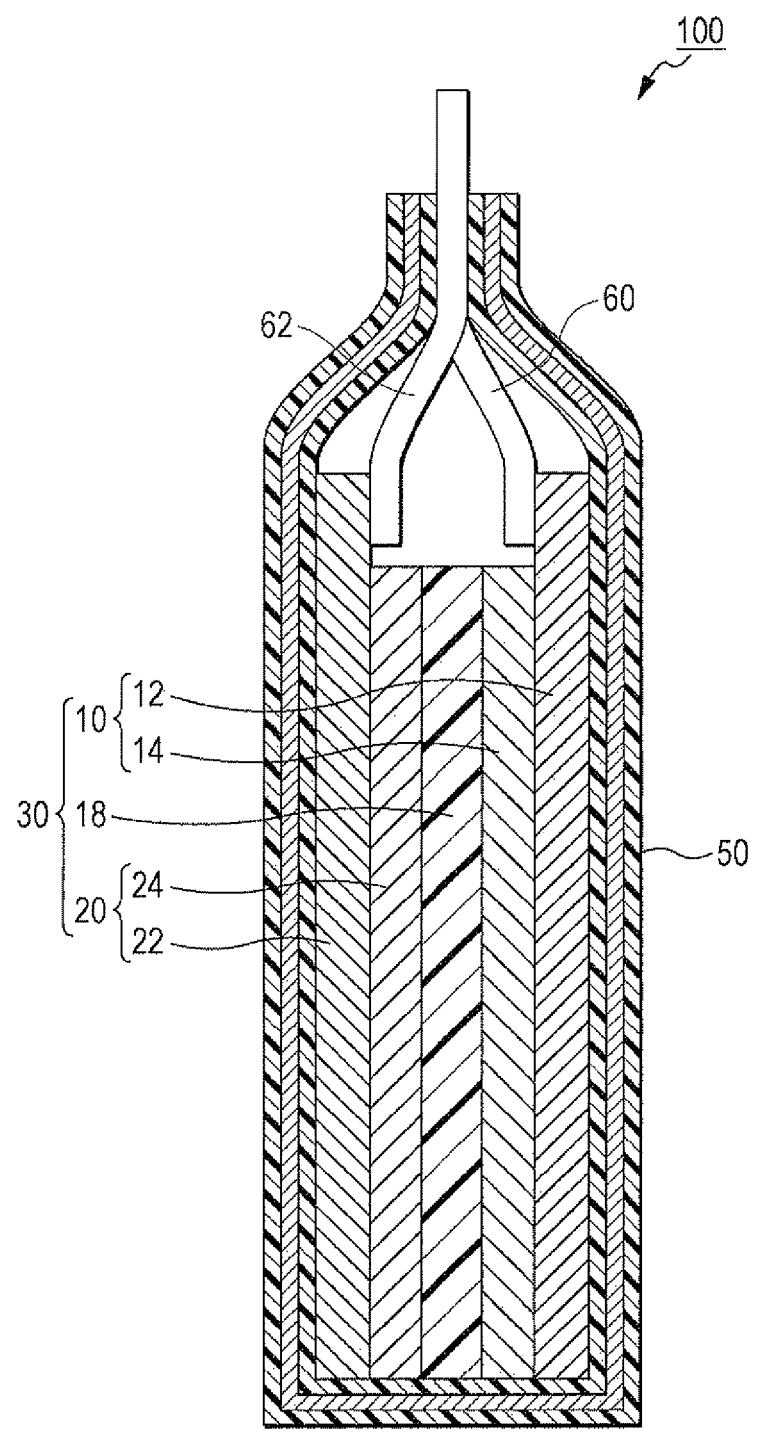

LITHIUM-ION SECONDARY BATTERY WITH A NEGATIVE ELECTRODE CONTAINING VANADIUM

BACKGROUND OF THE INVENTION

1. Field of the Invention

The present invention relates to a lithium-ion secondary battery.

2. Description of the Related Art

In the related art, laminar compounds such as $LiCoO_2$ and $LiNi_{1/3}Mn_{1/3}Co_{1/3}O_2$ and spinel compounds such as $LiMn_2O_4$ have been used as a positive electrode material (positive electrode active material) of a lithium-ion secondary battery. In recent years, olivine-type compounds represented by $LiFePO_4$ have attracted attention. The positive electrode material having the olivine structure has been known to have high thermal stability at a high temperature and to have a high safety.

However, a lithium-ion secondary battery using $LiFePO_4$ has defects that a charging/discharging voltage thereof is about 3.5 V, which is low, and energy density is lowered. Therefore, $LiCoPO_4$, $LiNiPO_4$ and the like have been proposed as phosphate positive electrode materials capable of realizing a high charging/discharging voltage. However, at present lithium-ion secondary batteries using these positive electrode materials cannot obtain a sufficient capacity. As a compound capable of realizing a 4V-grade charging/discharging voltage among the phosphate positive electrode materials, vanadium phosphates having structures of $LiVOPO_4$ and $Li_3V_2(PO_4)_3$ and $LiMnPO_4$ have been known.

In the positive electrode material of the related art, generally, there is a problem of swelling of the lithium-ion secondary battery due to gas generation. In addition, it is not known that gas generation occurs in the lithium-ion secondary battery using the phosphate compound in some cases. However, gas is actually generated and the lithium-ion secondary battery is swollen to cause a problem that shape stability is impaired. In particular, when a metal laminated case is used, a change in the shape thereof becomes remarkable.

While there is a disclosure about vanadium phosphate in Japanese Unexamined Patent Application No. 2004-303527 and Japanese Unexamined Patent Application No. 2000-268881, a problem of gas generation is not disclosed.

SUMMARY OF THE INVENTION

The present invention is made to solve the problem of gas generation in the related art, and an object of the present invention is to provide a lithium-ion secondary battery capable of suppressing gas generation thereof.

According to the present invention, in order to achieve the object, there is provided a lithium-ion secondary battery including a positive electrode containing an active material made of a compound including lithium and a transition metal; an electrolyte containing 5 to 30 ppm of hydrofluoric acid; and a negative electrode containing 1 to 100 ppm of vanadium.

Gas generation can be suppressed by using the lithium-ion secondary battery according to the present invention.

The lithium-ion secondary battery according to the present invention may use an active material of $Li_a(M)_b(PO_4)_cF_d$ (M=VO or V, $0.9 \leq a \leq 3.3$, $0.9 \leq b \leq 2.2$, $0.9 \leq c \leq 3.3$, $0 \leq d \leq 2.0$) as the positive electrode.

Accordingly, the gas generation of the lithium-ion secondary battery can be remarkably suppressed.

According to the present invention, it is possible to provide the lithium-ion secondary battery capable of suppressing gas generation.

BRIEF DESCRIPTION OF THE DRAWINGS

FIG. 1 is a schematic cross-sectional view showing a lithium-ion secondary battery according to an embodiment.

DESCRIPTION OF THE PREFERRED EMBODIMENTS

In the following, a preferred embodiment of the present invention will be described with reference to the accompanying drawings. The present invention is not limited to the following embodiment. The constituents described below include constituents which can be easily assumed by those skilled in the art and substantially the same components. Furthermore, the constituents described below can be appropriately combined.

As an electrolyte, an electrolyte in which a lithium salt is dissolved in a nonaqueous solvent (organic solvent) can be used. Examples of the lithium salt to be used include salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_7)_2$, $LiN(CF_3CF_2SO_2)_2$, $LiN(CF_3SO_2)(C_4F_9SO_2)$, $LiN(CF_3CF_2CO)_2$, and LiBOB. These salts may be used either singly or in combination of two kinds or more. When these lithium salts contain fluorine in the compounds, the fluorine reacts with some moisture in the air or the like to form hydrofluoric acid in some cases.

In addition, as the organic solvent, a mixture of cyclic carbonate and chain carbonate can be used. Examples of the cyclic carbonate preferably include propylene carbonate, ethylene carbonate, and fluoroethylene carbonate, and examples of the chain carbonate include diethyl carbonate, dimethyl carbonate, and methyl ethyl carbonate. These carbonates may be used either singly or in combination of two kinds or more at an arbitrary ratio.

It is known that hydrofluoric acid is formed by hydrolyzing a supporting electrolyte containing fluorine such as $LiPF_6$. A hydrofluoric acid amount can be adjusted by removing hydrofluoric acid or adding hydrofluoric acid using a hydrofluoric acid trapping agent.

In the lithium-ion secondary battery according to the embodiment, the following compounds can be used as a positive electrode active material. The positive electrode active material is not limited in particular as long as the material allows intercalation and deintercalation of lithium ions, deintercalation and intercalation of lithium ions, or doping and undoping of lithium ions and their counteranions (for example, $PF6^-$) to proceed reversibly, and known positive electrode active materials can be used.

Examples of the positive electrode active material include lithium cobaltate ($LiCoO_2$), lithium nickelate ($LiNiO_2$), lithium manganese spinal ($LiMn_2O_4$), mixed metal oxides expressed by the general formula of $LiNi_xCo_yMn_zM_aO_2$ (where $x+y+z+a=1$, $0 \leq x \leq 1$, $0 \leq y \leq 1$, $0 \leq z \leq 1$, $0 \leq a \leq 1$, and M is at least one kind of element selected from Al, Mg, Nb, Ti, Cu, Zn, and Cr), a lithium vanadium compound ($LiV_2O_5$), olivine-type $LiMPO_4$ (where M is at least one kind of element selected from Co, Ni, Mn or Fe, Mg, Nb, Ti, Al, and Zr, or VO), and mixed metal oxides such as lithium titanate ($Li_4Ti_5O_{12}$). Among these examples, vanadium phosphate expressed by the structural formula of $Li_a(M)_b(PO_4)_cF_d$ (M=VO or V, $0.9 \leq a \leq 3.3$, $0.9 \leq b \leq 2.2$, $0.9 \leq c \leq 3.3$, $0 \leq d \leq 2.0$) is preferably used and vanadium phosphate expressed by the structural formula $LiVOPO_4$ or $Li_3V_2(PO_1)_3$ is preferable.

Particularly, LiVOPO$_4$ is preferably used from a viewpoint of suppressing gas generation. It is assumed that LiVOPO$_4$ effectively reacts with a vanadium compound dispersed from a negative electrode to suppress gas generation.

It is known that the vanadium phosphate can be synthesized by solid-phase synthesis, hydrothermal synthesis, a carbon thermal reduction method, and the like. Among these methods, vanadium phosphate prepared by the hydrothermal synthesis has a small particle diameter and a tendency to be excellent in rate performance, and the vanadium phosphate prepared by the hydrothermal synthesis is preferable as the positive electrode active material. The vanadium phosphate synthesized by the hydrothermal synthesis is used so that gas generation is further suppressed. It is assumed that the positive electrode active material synthesized by the hydrothermal synthesis effectively reacts with a vanadium compound dispersed from the negative electrode to suppress gas generation.

The lithium-ion secondary battery according to the embodiment can suppress gas generated at the time of charging/discharging. The mechanism thereof is assumed as follows. It is considered that the vanadium phosphate positive electrode reacts with the electrolyte and the electrolyte is subjected to oxidative decomposition so that gas is generated.

In the embodiment, the vanadium compound is added to the negative electrode in advance and the density of vanadium in the negative electrode is adjusted to fall in a range of 1 to 100 ppm. It is considered that a part of the vanadium compound included in the negative electrode electrolyte reacts with hydrofluoric acid included in the electrolyte to disperse the vanadium compound in the electrolyte. It is assumed that the vanadium compound dispersed in the electrolyte adheres onto the positive electrode to form a film so that gas generation is suppressed. When the vanadium amount is less than 1 ppm in the negative electrode, gas is easily generated, and even when the vanadium amount is more than 100 ppm, gas generation is remarkable.

In the embodiment, the hydrofluoric acid amount is adjusted to fall in a range of 5 to 30 ppm in the electrolyte by adding hydrofluoric acid to the electrolyte or removing hydrofluoric acid. The hydrofluoric acid amount is adjusted to fall in the range of 5 to 30 ppm so that the amount in which the vanadium compound included the negative electrode is dispersed in the electrolyte can be adjusted to fall a certain range. When the hydrofluoric acid amount is less than 5 ppm in the electrolyte, gas is easily generated and even when the hydrofluoric acid amount is more than 30 ppm, gas is generated.

As shown in FIG. 1, a lithium-ion secondary battery 100 according to the embodiment includes a power generating element 30 having a plate-like negative electrode 20 and a plate-like positive electrode 10 arranged to oppose each other and a plate-like separator 18 adjacently arranged between the negative electrode 20 and the positive electrode 10, an electrolyte containing lithium ions, a case 50 accommodating the electrolyte and the power generating element in a sealed state, a negative electrode lead 62 in which one edge part is electrically connected to the negative electrode 20 and the other edge part is protruded outside of the case, and a positive electrode lead 60 in which one edge part is electrically connected to the positive electrode 10 and the other edge part is protruded outside of the case.

The negative electrode 20 has a negative electrode current collector 22 and a negative electrode active material layer 24 stacked on the negative electrode current collector 22. In addition, the positive electrode 10 has a positive electrode current collector 12 and a positive electrode active material layer 14 stacked on the positive electrode current collector 12. The separator 18 is disposed between the negative electrode active material layer 24 and the positive electrode active material layer 14.

The positive electrode active material layer 14 contains at least an active material according to the embodiment and a conductive auxiliary agent. Examples of the conductive auxiliary agent include carbon materials such as carbon black, metal powders such as copper, nickel, stainless, and iron, mixtures of the carbon materials and the metal powders, and conductive oxides such as ITO. The positive electrode active material layer may contain a binder which binds the active material and the conductive auxiliary agent. The positive electrode active material layer 14 is formed through a step of applying a coating material including the positive electrode active material, the binder, the solvent, and the conductive auxiliary agent on the positive electrode current collector 12.

Examples of the negative electrode active material contained in the negative electrode active material layer 24 include carbon materials such as natural graphite, synthetic graphite, hard carbon, soft carbon, and low temperature fired carbon, metals such as Al, Si (silicon), Sn and Si which are combinable with lithium, or alloys, amorphous compounds mainly composed of oxides such as SiO$_x$ (1<x≤2) (silicon oxide) and SnO$_x$ (1<x≤2), lithium titanate (Li$_4$Ti$_5$O$_{12}$), and TiO$_2$. Among these examples, when silicon and silicon oxide are used as the negative electrode active material, gas generation is suppressed. It is assumed that this is because silicon mixed in the negative electrode effectively promotes the reaction of a vanadium source and hydrofluoric acid present in the negative electrode. When silicon and silicon oxide are mixed with carbon of graphite and the like to be used, there is an effect of suppressing gas generation.

The vanadium source in the negative electrode is not limited in particular and oxides such as V$_2$O$_5$, V$_2$O$_4$, and V$_2$O$_3$, chlorides such as VCl$_3$ and VCl$_4$, phosphate compounds such as LiVOPO$_4$ and VOPO$_4$, vanadium acetylacetonate, sodium metavanadate and the like are mixed in a range of 1 to 100 ppm. The negative electrode active material may be bound by a binder. The negative electrode active material layer 24 is formed through a step of applying a coating material containing the negative electrode active material and the like onto the negative electrode current collector 22, as in the case of the positive electrode active material layer 14.

Moreover, the separator 18 may have an electrically insulating porous structure, examples of which include a monolayer or stacked bodies of films constituted by polyethylene, polypropylene, or polyolefin, extended films of mixtures of these resins, and fibrous nonwoven fabrics constituted by at least one kind of constituent material selected from the group consisting of cellulose, polyester, and polypropylene.

The case 50 is one which seals the power generating element 30 and electrolyte therein. The case 50 is not limited in particular as long as a material can inhibit the electrolyte from leaking out therefrom and moisture and the like from invading the lithium-ion secondary battery 100 from the outside. For example, it is desirable to use a metal laminated film as the case 50 from a viewpoint of lightening the weight and a high degree of freedom in the shape.

The leads 60 and 62 are formed from a conductive material such as aluminum.

From the above, a preferred embodiment of the method for producing an active material according to the present invention is described in detail. However, the present invention is not limited to the above-described embodiment.

EXAMPLES

Hereinafter, the present invention will be described in more detail with reference to Examples and Comparative Examples, and will not be limited to the following examples.

Example 1

Preparation of Evaluation Cell $V_2O_5$, LiOH and $H_3PO_4$ were prepared at a mole ratio of about 1:2:2 and heated at 160° C. for 8 hours in a sealed container to fire an obtained paste at 600° C. for 4 hours in the atmosphere. It was found that the particles obtained in this manner were $\beta$-LiVOPO$_4$. The LiVOPO$_4$ particles and acetylene black were weighed at a weight ratio of 90:10, and were mixed by a planetary ball mill for 1 minute to obtain a mixture. The obtained mixture and polyvinylidene fluoride (PVDF) as a binder were mixed and the resultant was dispersed in N-methyl-2-pyrrolidone (NMP) as a solvent to prepare a slurry. Then, the weight ratio of the mixture and PVDF in the slurry was adjusted to 90:10. After the slurry was applied onto an aluminum foil as a current collector, dried, and pressed, an electrode (positive electrode) in which an active material layer was formed was obtained.

Next, synthetic graphite as a negative electrode and a solution of 5 wt % of N-methylpyrrolidone (NMP) of polyvinylidene fluoride (PVDF) were mixed to have a ratio of synthetic graphite:polyvinylidene fluoride=93:7, and vanadium pentoxide ($V_2O_5$) was mixed to be 1 ppm with respect to synthetic graphite and polyvinylidene fluoride to prepare a slurry coating material. The coating material was applied to a copper foil as a current collector, dried, and pressed to prepare a negative electrode.

The positive electrode and the negative electrode were stacked with a separator made of a polyethylene microporous film interposed therebetween to obtain a stacked body (matrix). The stacked body was put into an aluminum laminated pack.

As for an electrolyte, ethylene carbonate (EC) and diethyl carbonate (DEC) were mixed at a volume ratio of 3:7, LiPF$_6$ as a supporting electrolyte was dissolved to be 1 mol/L. Hydrofluoric acid was added thereto to be 15 ppm.

The electrolyte was injected in the aluminum laminated pack in which the stacked body had been put and then, was sealed in vacuum, so as to prepare an evaluation cell of Example 1.

An evaluation cell of Example 2 was prepared as in Example 1 except that the vanadium amount that was added to the negative electrode was 2 ppm.

An evaluation cell of Example 3 was prepared as in Example 1 except that the vanadium amount that was added to the negative electrode was 5 ppm.

An evaluation cell of Example 4 was prepared as in Example 1 except that the vanadium amount that was added to the negative electrode was 10 ppm.

An evaluation cell of Example 5 was prepared as in Example 1 except that the vanadium amount that was added to the negative electrode was 30 ppm.

An evaluation cell of Example 6 was prepared as in Example 1 except that the vanadium amount that was added to the negative electrode was 50 ppm.

An evaluation cell of Example 7 was prepared as in Example 1 except that the vanadium amount that was added to the negative electrode was 100 ppm.

An evaluation cell of Example 8 was prepared as in Example 6 except that LiVOPO$_4$ formed by the solid-phase synthesis was used as a positive electrode active material.

An evaluation cell of Example 9 was prepared as in Example 6 except that the hydrofluoric acid amount in the electrolyte was 5 ppm.

An evaluation cell of Example 10 was prepared as in Example 6 except that the hydrofluoric acid amount in the electrolyte was 10 ppm.

An evaluation cell of Example 11 was prepared as in Example 6 except that the hydrofluoric acid amount in the electrolyte was 20 ppm.

An evaluation cell of Example 12 was prepared as in Example 6 except that the hydrofluoric acid amount in the electrolyte was 30 ppm.

An evaluation cell of Example 13 was prepared as in Example 2 except that Li$_3$V$_2$(PO$_4$)$_3$ formed by the hydrothermal synthesis was used as a positive electrode active material.

An evaluation cell of Example 14 was prepared as in Example 13 except that the vanadium amount that was added to the negative electrode was 10 ppm.

An evaluation cell of Example 15 was prepared as in Example 13 except that the vanadium amount that was added to the negative electrode was 50 ppm.

An evaluation cell of Example 16 was prepared as in Example 13 except that the vanadium amount that was added to the negative electrode was 90 ppm.

An evaluation cell of Example 17 was prepared as in Example 8 except that Li(Ni$_{0.33}$Mn$_{0.33}$Co$_{0.33}$)O$_2$ formed by the solid-phase synthesis was used as a positive electrode active material.

An evaluation cell of Example 18 was prepared as in Example 8 except that Li(Ni$_{0.8}$Co$_{0.15}$Al$_{0.05}$)O$_2$ formed by the solid-phase synthesis was used as a positive electrode active material.

An evaluation cell of Example 19 was prepared as in Example 8 except that LiCoO$_2$ formed by the solid-phase synthesis was used as a positive electrode active material.

An evaluation cell of Comparative Example 1 was prepared as in Example 1 except that the vanadium amount that was added to the negative electrode was 0.5 ppm.

An evaluation cell of Comparative Example 2 was prepared as in Example 1 except that the vanadium amount that was added to the negative electrode was 120 ppm.

An evaluation cell of Comparative Example 3 was prepared as in Example 6 except that the hydrofluoric acid amount in the electrolyte was 3 ppm.

An evaluation cell of Comparative Example 4 was prepared as in Example 6 except that the hydrofluoric acid amount in the electrolyte was 45 ppm.

An evaluation cell of Example 20 was prepared as in Example 8 except that the vanadium amount that was added to the negative electrode was 5 ppm.

An evaluation cell of Example 21 was prepared as in Example 8 except that the vanadium amount that was added to the negative electrode was 100 ppm.

A mixture in which silicon oxide and silicon were mixed at a ratio of 1:1 was used as the negative electrode and the mixture was mixed with a solution of 20 wt % of N-methylpyrrolidone (NMP) of polyamideimide (PAI) so that a ratio of a total weight of silicon oxide and silicon:PAI weight=90:10. Therefore, a slurry coating material was prepared. After the coating material was applied to a copper foil as a current collector, dried, and pressed, a negative electrode was prepared. An evaluation cell of Example 22 was prepared as in Example 3 except that the above-mentioned negative electrode was used.

An evaluation cell of Example 23 was prepared as in Example 22 except that the vanadium amount that was added to the negative electrode was 50 ppm.

An evaluation cell of Example 24 was prepared as in Example 22 except that the vanadium amount that was added to the negative electrode was 100 ppm.

A mixture in which silicon oxide, silicon and graphite were mixed at a ratio of 0.5:0.5:9 was used as a negative electrode negative electrode, and the mixture was mixed with a solution of 20 wt % of methylpyrrolidone (NMP) of polyamideimide (PAI) so that a ratio of a total weight of silicon oxide, silicon and graphite:PAI weight=90:10. Therefore, a slurry coating material was prepared. After the coating material was applied to a copper foil as a current collector, dried, and pressed, a negative electrode was prepared. An evaluation cell of Example 25 was prepared as in Example 3 except that the above-mentioned negative electrode was used.

An evaluation cell of Example 26 was prepared as in Example 25 except that the vanadium amount that was added to the negative electrode was 50 ppm.

An evaluation cell of Example 27 was prepared as in Example 25 except that the vanadium amount that was added to the negative electrode was 100 ppm.

An evaluation cell of Example 28 was prepared as in Example 1 except that the vanadium amount that was added to the negative electrode was 60 ppm.

An evaluation cell of Example 29 was prepared as in Example 1 except that the vanadium amount that was added to the negative electrode was 70 ppm.

An evaluation cell of Example 30 was prepared as in Example 1 except that the vanadium amount that was added to the negative electrode was 80 ppm.

Measurement of Gas Generation Amount

Constant current-constant voltage charging was carried out on the evaluation cells at a current value of 0.1 C up to 3.6 V, and in the charging state, a gas generation amount was measured. The gas generation amount was measured by the Archimedes method. Specifically, the cells were immersed into pure water and the buoyant force was measured to obtain a gas generation amount from the increased volume of the water.

As shown in Table 1, it was apparent that gas generation could be suppressed in Examples 1 to 27 and there was no gas generation suppression effect in Comparative Examples 1 to 4.

TABLE 1

| | | Positive electrode active material | Negative electrode | Positive electrode active material synthesis method | Vanadium amount in negative electrode (ppm) | Hydrofluoric acid amount in electrolyte (ppm) | Gas genration amout (%) |
|---|---|---|---|---|---|---|---|
| Example | 1 | $LiVOPO_4$ | Graphite | Hydrothermal synthesis | 1 | 15 | 30.5 |
| Example | 2 | $LiVOPO_4$ | Graphite | Hydrothermal synthesis | 2 | 15 | 23.5 |
| Example | 3 | $LiVOPO_4$ | Graphite | Hydrothermal synthesis | 5 | 15 | 17.9 |
| Example | 4 | $LiVOPO_4$ | Graphite | Hydrothermal synthesis | 10 | 15 | 16.5 |
| Example | 5 | $LiVOPO_4$ | Graphite | Hydrothermal synthesis | 30 | 15 | 12.6 |
| Example | 6 | $LiVOPO_4$ | Graphite | Hydrothermal synthesis | 50 | 15 | 7.4 |
| Example | 7 | $LiVOPO_4$ | Graphite | Hydrothermal synthesis | 100 | 15 | 24.2 |
| Example | 8 | $LiVOPO_4$ | Graphite | Solid-phase synthesis | 50 | 15 | 31.2 |
| Example | 9 | $LiVOPO_4$ | Graphite | Hydrothermal synthesis | 50 | 5 | 16.1 |
| Example | 10 | $LiVOPO_4$ | Graphite | Hydrothermal synthesis | 50 | 10 | 12.3 |
| Example | 11 | $LiVOPO_4$ | Graphite | Hydrothermal synthesis | 50 | 20 | 13.0 |
| Example | 12 | $LiVOPO_4$ | Graphite | Hydrothermal synthesis | 50 | 30 | 18.6 |
| Example | 13 | $Li_3V_2(PO_4)_3$ | Graphite | Hydrothermal synthesis | 2 | 15 | 31.2 |
| Example | 14 | $Li_3V_2(PO_4)_3$ | Graphite | Hydrothermal synthesis | 10 | 15 | 26.6 |
| Example | 15 | $Li_3V_2(PO_4)_3$ | Graphite | Hydrothermal synthesis | 50 | 15 | 22.1 |
| Example | 16 | $Li_3V_2(PO_4)_3$ | Graphite | Hydrothermal synthesis | 90 | 15 | 34.0 |
| Example | 17 | $Li(Ni_{0.33}Mn_{0.33}Co_{0.33})O_2$ | Graphite | Solid-phase synthesis | 50 | 15 | 28.7 |
| Example | 18 | $Li(Ni_{0.8}Co_{0.15}Al_{0.05})O_2$ | Graphite | Solid-phase synthesis | 50 | 15 | 31.9 |
| Example | 19 | $LiCoO_2$ | Graphite | Solid-phase synthesis | 50 | 15 | 32.6 |
| Comparative Example | 1 | $LiVOPO_4$ | Graphite | Hydrothermal synthesis | 0.5 | 15 | 48.3 |
| Comparative Example | 2 | $LiVOPO_4$ | Graphite | Hydrothermal synthesis | 120 | 15 | 54.3 |
| Comparative Example | 3 | $LiVOPO_4$ | Graphite | Hydrothermal synthesis | 50 | 3 | 43.1 |
| Comparative Example | 4 | $LiVOPO_4$ | Graphite | Hydrothermal synthesis | 50 | 45 | 65.8 |
| Example | 20 | $LiVOPO_4$ | Graphite | Solid-phase synthesis | 5 | 15 | 27.3 |
| Example | 21 | $LiVOPO_4$ | Graphite | Solid-phase synthesis | 100 | 15 | 33.3 |
| Example | 22 | $LiVOPO_4$ | Silicon oxide + Silicon | Hydrothermal synthesis | 5 | 15 | 13.0 |
| Example | 23 | $LiVOPO_4$ | Silicon oxide + Silicon | Hydrothermal synthesis | 50 | 15 | 4.2 |
| Example | 24 | $LiVOPO_4$ | Silicon oxide + Silicon | Hydrothermal synthesis | 100 | 15 | 18.2 |
| Example | 25 | $LiVOPO_4$ | Silicon oxide + Silicon + Graphite | Hydrothermal synthesis | 5 | 15 | 16.1 |
| Example | 26 | $LiVOPO_4$ | Silicon oxide + Silicon + Graphite | Hydrothermal synthesis | 50 | 15 | 6.3 |
| Example | 27 | $LiVOPO_4$ | Silicon oxide + Silicon + Graphite | Hydrothermal synthesis | 100 | 15 | 21.7 |
| Example | 28 | $LiVOPO_4$ | Graphite | Hydrothermal synthesis | 60 | 15 | 7.0 |
| Example | 29 | $LiVOPO_4$ | Graphite | Hydrothermal synthesis | 70 | 15 | 8.8 |
| Example | 30 | $LiVOPO_4$ | Graphite | Hydrothermal synthesis | 80 | 15 | 12.3 |

What is claimed is:

1. A lithium-ion secondary battery comprising:
   a positive electrode containing an active material made of a compound including lithium and a transition metal;
   an electrolyte containing 5 to 30 ppm of hydrofluoric acid; and
   a negative electrode containing 1 to 100 ppm of vanadium,
   wherein when the negative electrode contains graphite as an active material, the negative electrode is obtained by mixing graphite with a vanadium source.

2. The lithium-ion secondary battery according to claim 1, wherein the positive electrode contains an active material of $Li_a(M)_b(PO_4)_cF_d$ (M=VO or V, $0.9 \leq a \leq 3.3$, $0.9 \leq b \leq 2.2$, $0.9 \leq c \leq 3.3$, $0 \leq d \leq 2.0$).

3. The lithium-ion secondary battery according to claim 1, wherein the negative electrode contains graphite as an active material.

4. The lithium-ion secondary battery according to claim 1, wherein the negative electrode contains a mixture of silicon and silicon oxide as an active material.

5. The lithium-ion secondary battery according to claim 1, wherein the negative electrode contains a mixture of graphite, silicon and silicon oxide as an active material.

6. The lithium-ion secondary battery according to claim 1, wherein the electrolyte contains 5 to 15 ppm of hydrofluoric acid.

7. The lithium-ion secondary battery according to claim 1, wherein the electrolyte contains 20 to 30 ppm of hydrofluoric acid.

8. The lithium-ion secondary battery according to claim 1, wherein the positive electrode contains $LiVOPO_4$ as an active material.

9. The lithium-ion secondary battery according to claim 1, wherein $V_2O_5$ is a source for the vanadium.

* * * * *